United States Patent
Teranishi

(12)
(10) Patent No.: US 6,937,880 B2
(45) Date of Patent: Aug. 30, 2005

(54) TELECOMMUNICATION DEVICE WITH IMPROVED CALL-PRIORITY NOTIFICATION FUNCTION AND METHOD OF NOTIFICATION OF CALL-PRIORITY

(75) Inventor: Toshihiro Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 675 days.

(21) Appl. No.: 09/969,751

(22) Filed: Oct. 4, 2001

(65) Prior Publication Data

US 2002/0045466 A1 Apr. 18, 2002

(30) Foreign Application Priority Data

Oct. 12, 2000 (JP) ........................................ 2000-311819

(51) Int. Cl.$^7$ ................................................ H04B 1/00
(52) U.S. Cl. ................. 455/567; 455/415; 379/355.02; 379/372
(58) Field of Search ................................ 455/415–416, 455/566–567; 379/93.23, 142.06, 355.01–355.1, 372–376.01

(56) References Cited

U.S. PATENT DOCUMENTS

| | | | | |
|---|---|---|---|---|
| 5,602,908 | A | * | 2/1997 | Fan .............................. 379/199 |
| 6,118,859 | A | * | 9/2000 | Giethoorn ............... 379/142.06 |
| 6,480,581 | B1 | * | 11/2002 | Wu et al. ................. 379/93.01 |
| 6,516,200 | B1 | * | 2/2003 | Schmidt et al. ............. 455/518 |

FOREIGN PATENT DOCUMENTS

| | | |
|---|---|---|
| EP | 0 978 983 A2 | 2/2000 |
| GB | 2 347 578 A | 9/2000 |
| GB | 2 349774 A | 11/2000 |
| GB | 2 364 850 A | 2/2002 |
| JP | 7-325787 | 12/1995 |
| JP | 09-83637 | 3/1997 |
| JP | 10-257135 | 9/1998 |
| JP | 11-187151 | 7/1999 |
| JP | 11-252644 | 9/1999 |
| JP | 11-252644 A | 9/1999 |
| JP | 11-298600 | 10/1999 |
| JP | 2000-32116 | 1/2000 |
| JP | 2000-124987 | 4/2000 |
| JP | 2000-165508 | 6/2000 |
| WO | WO 01/45361 A1 | 6/2001 |

* cited by examiner

Primary Examiner—Duc Nguyen
(74) Attorney, Agent, or Firm—Foley & Lardner LLP

(57) ABSTRACT

The present invention provides a telecommunication device comprising: a telecommunication function block for receiving a call from another telecommunication device for communication; and a priority-determination-standard-setting function block for setting a priority-determination-standard for determining a priority of a received call; and a priority-level determining function block electrically coupled to the priority-determination-standard-setting function block for determining a priority level of the call in accordance with the priority-determination-standard.

41 Claims, 9 Drawing Sheets

TELECOMMUNICATION DEVICE WITH IMPROVED CALL-PRIORITY NOTIFICATION FUNCTION AND METHOD OF NOTIFICATION OF CALL-PRIORITY

BACKGROUND OF THE INVENTION

1. Field of the Invention

The present invention relates to telecommunication device and system with a function of noticing a call priority as well as a method of noticing a call priority in the telecommunication system, and more particularly to telephone device and system with a function of noticing a call priority as well as a method of noticing a call priority in the telephone system.

2. Description of the Related Art

Some of the mobile telephones have a memory function of storing past call histories with caller's telephone numbers by utilizing call identification numbers included in call set-up signals. The past call histories include first type calls, to which receivers have been responded during the call, and second type calls, to which receivers have not yet been responded during the call. The first type calls may also be referred to as "concurrently responded call". The second type calls may also be referred to as "concurrently non-responded call".

Some of the mobile telephones have a function of storing sets of call identification numbers and corresponding call times, so as to display the past call histories along with the call identification numbers and corresponding call times. The past call histories include informations about "when and who have called" with the above type of the calls, for example, "past responded call" and "past non-responded call". Those past call histories seem useful for post-replying to the past non-responded call.

The conventional telephone devices with the function of displaying the past call histories have the following issues.

A first issue of the conventional telephone devices is that the current call information is displayed without any priority data or information, for which reason the user is unable to recognize the priority of the current call.

A second issue of the conventional telephone devices is that the past call histories including the past non-responded calls are displayed without any respective priority data or information, for which reason the user is unable to recognize the respective priorities of the past non-responded calls.

Japanese laid-open patent publication No. 11-252644 discloses another conventional telephone device having additional functions for adding the priority to the call. This telephone device has a first function of selecting one of the priority levels and a second function of adding the selected priority level to a control message. The caller selects the priority level which indicates the degree of emergency and sets the selected priority level to the call setup signal before sending a call to a target telephone. The receiver is able to recognize the priority of the received call with reference to a displayed priority information or with reference to a calling pattern such as a calling tone or a calling sound which corresponds to each of the priority levels.

The above other conventional telephone device is, however, disadvantageous in the following viewpoints. The above addition of the priority to the call setup signal needs to change the standardized regulation. The priority depends on the decision of the caller or sender, but is independent from the priority level standard of the receiver. It is possible that the receiver considers that the call with the high priority level given by the sender or caller is not-important. It is also possible that the receiver considers that the call with the low priority level given by the sender or caller is important.

Further disadvantage of the above conventional telephone is that the notice of the priority does not respond to the change to the priority standard by the receiver side.

In the above circumstances, the development of a novel telephone device free from the above problems is desirable.

SUMMARY OF THE INVENTION

Accordingly, it is an object of the present invention to provide a novel telecommunication device free from the above problems.

It is a further object of the present invention to provide a novel telecommunication device capable of not only simple-displaying the past call history informations including the call times and the sender's names and/or sender's telephone numbers but also advanced-displaying the past call history informations based on the priority data.

It is a still further object of the present invention to provide a novel telecommunication device capable of selectively notifying calls with high priority levels from the past call history informations.

It is yet a further object of the present invention to provide a novel telecommunication device capable of sending a call with the priority which corresponds to the receiver's side priority standard.

It is further more object of the present invention to provide a novel telecommunication device capable of setting the priority in response to the change to the receiver's side priority standard.

It is more over object of the present invention to provide a novel telecommunication device capable of selecting past non-responded calls with a high priority recognized in accordance with an optionally set priority-determination-standard to enable the user to easily recognize whether the non-responded call is important.

It is still more object of the present invention to provide a novel telecommunication device capable of recognizing the priority for displaying the high priority call with a priority-indicating flag to enable the user to visually recognize the priority.

It is yet more object of the present invention to provide a novel telecommunication device capable of recognizing the high priority of the received call and displaying the non-responded call with the high priority with no change to an existent base station system nor modification to radio interface signals.

It is another object of the present invention to provide a novel telecommunication device allowing the call-receiver to optionally set the priority-determination-standard for displaying the priority of the non-responded call in accordance with the user's intention, whereby a freedom how to display or notice the priority is increased.

It is still another object of the present invention to provide a novel telecommunication device allowing the user to freely change the optionally set priority-determination-standard in his or her discretion.

It is yet another object of the present invention to provide a novel telecommunication device allowing that if the owner has lost the device, then the owner may send the lost device his or her call to notify the finder of the lost device.

The present invention provides a telecommunication device comprising: a telecommunication function block for receiving a call from another telecommunication device for communication; and a priority-determination-standard-setting function block for setting a priority-determination-standard for determining a priority of a received call; and a priority-level determining function block electrically coupled to the priority-determination-standard-setting function block for determining a priority level of the call in accordance with the priority-determination-standard.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
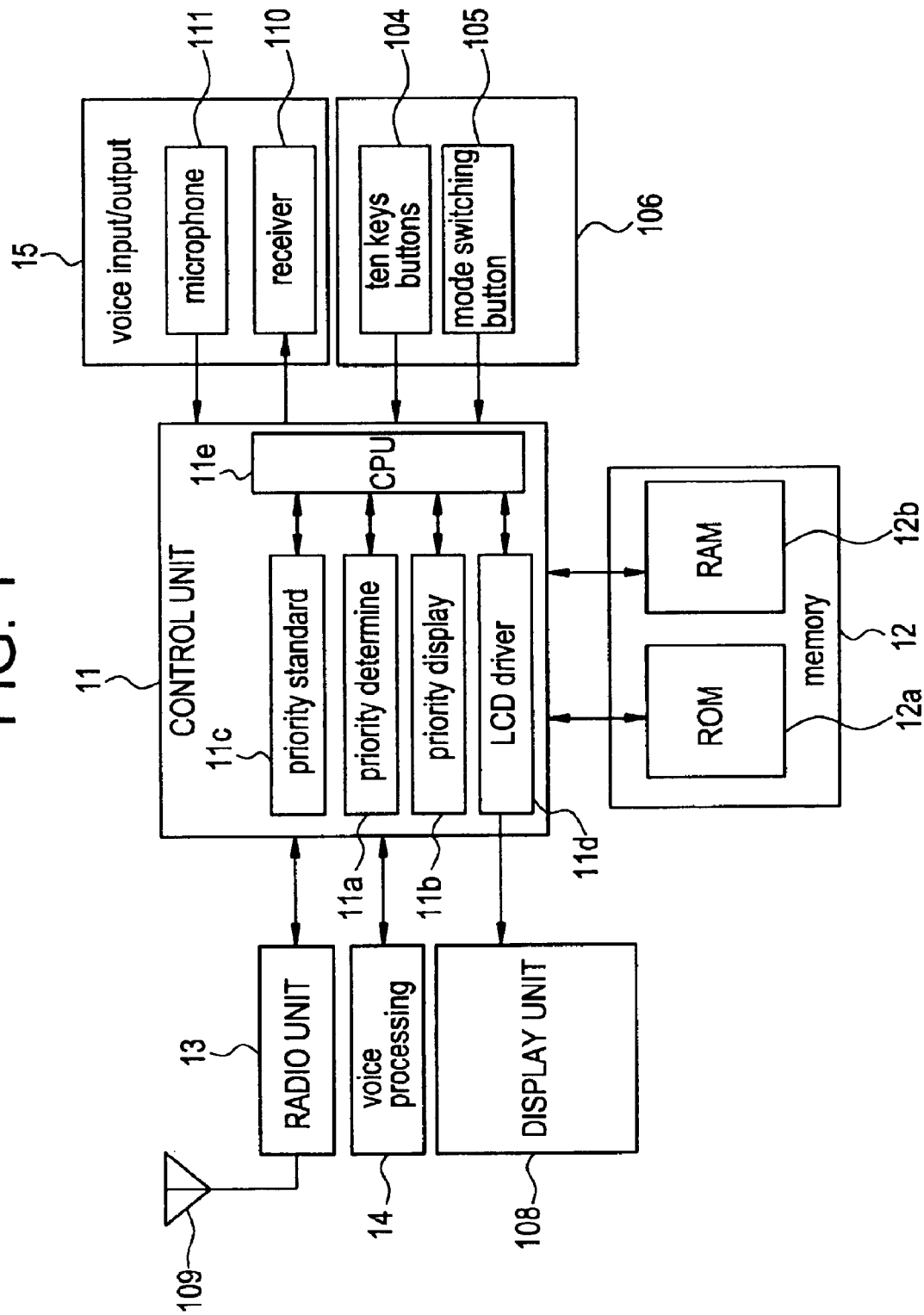
FIG. 1 is a block diagram illustrative of an internal structure of a novel wireless mobile telephone device in a first embodiment in accordance with the present invention.

A first aspect of the present invention is a telecommunication device comprising: a telecommunication function block for receiving a call from another telecommunication device for communication; and a priority-determination-standard-setting function block for setting a priority-determination-standard for determining a priority of a received call; and a priority-level determining function block electrically coupled to the priority-determination-standard-setting function block for determining a priority level of the call in accordance with the priority-determination-standard.

It is preferable to further comprise a priority-notifying function block electrically coupled to the priority-level determining function block for notifying the determined priority level to user.

It is preferable to furthermore comprise a display unit electrically coupled to the priority-notifying function block, wherein the priority-notifying function block comprises a priority-displaying function block for displaying the determined priority level on the display unit.

It is moreover preferable that the display unit commonly displays not only the determined priority level but also any other data and informations.

It is also preferable that the display unit exclusively displays only the priority level.

It is also preferable to further comprise an input interface for entering at least a parameter into the priority-determination-standard-setting function block to enable the priority-determination-standard-setting function block to set the priority-determination-standard in accordance with the entered at least parameter.

It is further preferable that the entered at least parameter comprises a maximum time period and a minimum number of call-receiving times, and the priority-level determining function block determines that a priority level would be high if the telecommunication device receives a larger number of calls than the minimum number from another telecommunication device within the maximum time period.

It is also preferable that the entered at least parameter comprises a minimum time period of a ringing time of a single call, and the priority-level determining function block determines that a priority level would be high if the telecommunication device receives a call which rings in a time period longer than the minimum time period.

It is further preferable to further comprise a memory electrically coupled to the priority-displaying function block for reading out at least a pre-stored information from the memory and transmitting the read information to the priority-displaying function block for displaying the information together with a priority.

It is furthermore preferable that the information includes an information related to an owner of the telecommunication device.

It is also preferable that the priority-determination-standard-setting function block and the priority-level determining function block are integrated in a control unit.

It is further preferable to further comprise an input interface electrically coupled to the control unit for entering at least a parameter into the priority-determination-standard function block to enable the priority-determination-standard function block to set the priority-determination-standard in accordance with the entered at least parameter.

It is further preferable that the priority-determination-standard-setting function block, the priority-level determining function block and the priority-notifying function block are integrated in a control unit.

It is further preferable to further comprise an input interface electrically coupled to the control unit for entering at least a parameter into the priority-determination-standard function block to enable the priority-determination-standard function block to set the priority-determination-standard in accordance with the entered at least parameter.

It is also preferable that the priority-determination-standard-setting function block, the priority-level determining function block and the priority-displaying function block are integrated in a control unit.

It is also preferable to furthermore comprise an input interface electrically coupled to the control unit for entering at least a parameter into the priority-determination-standard function block to enable the priority-determination-standard function block to set the priority-determination-standard in accordance with the entered at least parameter.

It is also preferable that the telecommunication device comprises a wire-less mobile telephone device.

It is further preferable that the wire-less mobile telephone device further includes: an antenna for receiving and transmitting a radio wave; a control unit; a radio unit electrically coupled to the antenna and also electrically coupled to the control unit, so that the radio unit is operable under the control of the control unit; a voice processing unit electrically coupled to the control unit for processing voice signals under the control of the control unit; a display unit electrically coupled to the control unit for a display under the control of the control unit; a memory electrically coupled to the control unit for storing any data and informations for enabling the control unit to have access to the memory; and an interface unit electrically coupled to the control unit for providing interfaces between the control unit and a user, wherein the control unit further includes: a central processing unit; the priority-determination-standard-setting function block electrically coupled to the central processing unit; and the priority-level determining function block electrically coupled through the central processing unit to the priority-determination-standard-setting function block.

It is further preferable that the control unit furthermore includes a priority-displaying function block electrically coupled through the central processing unit to the priority-level determining function block for displaying the determined priority level on the display unit.

It is furthermore preferable that the control unit moreover includes a display driver electrically coupled to the central processing unit and also coupled to the display unit.

The novel telecommunication device free from the above problems. The novel telecommunication device is capable of not only simple-displaying the past call history informations including the call times and the sender's names and/or sender's telephone numbers but also advanced-displaying the past call history informations based on the priority data.

The novel telecommunication device is capable of selectively notifying calls with high priority levels from the past call history informations.

The novel telecommunication device is capable of sending a call with the priority which corresponds to the receiver's side priority standard.

The novel telecommunication device is capable of setting the priority in response to the change to the receiver's side priority standard.

The novel telecommunication device is capable of selecting past non-responded calls with a high priority recognized in accordance with an optionally set priority-determination-standard to enable the user to easily recognize whether the non-responded call is important.

The novel telecommunication device is capable of recognizing the priority for displaying the high priority call with a priority-indicating flag to enable the user to visually recognize the priority.

The novel telecommunication device is capable of recognizing the high priority of the received call and displaying the non-responded call with the high priority with no change to an existent base station system nor modification to radio interface signals.

The novel telecommunication device allows the call-receiver to optionally set the priority-determination-standard for displaying the priority of the non-responded call in accordance with the user's intention, whereby a freedom how to display or notice the priority is increased.

The novel telecommunication device allows the user to freely change the optionally set priority-determination-standard in his or her discretion.

The novel telecommunication device allows that if the owner has lost the device, then the owner may send the lost device his or her call to notify the finder of the lost device.

A second aspect of the present invention is a telecommunication device comprising: a telecommunication unit for receiving a call from another telecommunication device for communication; and a priority-determination-standard-setting unit for setting a priority-determination-standard for determining a priority of a received call; and a priority-level determining unit electrically coupled to the priority-determination-standard-setting unit for determining a priority level of the call in accordance with the priority-determination-standard.

It is preferable to further comprise a priority-notifying unit electrically coupled to the priority-level determining unit for notifying the determined priority level to user.

It is preferable to furthermore comprise a display unit electrically coupled to the priority-notifying unit, wherein the priority-notifying unit comprises a priority-displaying unit for displaying the determined priority level on the display unit.

It is moreover preferable that the display unit commonly displays not only the determined priority level but also any other data and informations.

It is also preferable that the display unit exclusively displays only the priority level.

It is also preferable to further comprise an input interface for entering at least a parameter into the priority-determination-standard-setting unit to enable the priority-determination-standard-setting unit to set the priority-determination-standard in accordance with the entered at least parameter.

It is further preferable that the entered at least parameter comprises a maximum time period and a minimum number of call-receiving times, and the priority-level determining unit determines that a priority level would be high if the telecommunication device receives a larger number of calls than the minimum number from another telecommunication device within the maximum time period.

It is also preferable that the entered at least parameter comprises a minimum time period of a ringing time of a single call, and the priority-level determining unit determines that a priority level would be high if the telecommunication device receives a call which rings in a time period longer than the minimum time period.

It is also preferable to further comprise a memory electrically coupled to the priority-displaying unit for reading out at least a pre-stored information from the memory and transmitting the read information to the priority-displaying unit for displaying the information together with a priority.

It is further preferable that the information includes an information related to an owner of the telecommunication device.

It is also preferable that the priority-determination-standard-setting unit and the priority-level determining unit are integrated in a control unit.

It is preferable to further comprise an input interface electrically coupled to the control unit for entering at least a parameter into the priority-determination-standard unit to enable the priority-determination-standard unit to set the priority-determination-standard in accordance with the entered at least parameter.

It is also preferable that the priority-determination-standard-setting unit, the priority-level determining unit and the priority-notifying unit are integrated in a control unit.

It is further preferable to further comprise an input interface electrically coupled to the control unit for entering at least a parameter into the priority-determination-standard unit to enable the priority-determination-standard unit to set the priority-determination-standard in accordance with the entered at least parameter.

It is further preferable that the priority-determination-standard-setting unit, the priority-level determining unit and the priority-displaying unit are integrated in a control unit.

It is further preferable to further comprise an input interface electrically coupled to the control unit for entering at least a parameter into the priority-determination-standard unit to enable the priority-determination-standard unit to set the priority-determination-standard in accordance with the entered at least parameter.

It is also preferable that the telecommunication device comprises a wire-less mobile telephone device.

It is further preferable that the wire-less mobile telephone device further includes: an antenna for receiving and transmitting a radio wave; a control unit; a radio unit electrically coupled to the antenna and also electrically coupled to the control unit, so that the radio unit is operable under the control of the control unit; a voice processing unit electrically coupled to the control unit for processing voice signals under the control of the control unit; a display unit electrically coupled to the control unit for a display under the control of the control unit; a memory electrically coupled to the control unit for storing any data and informations for enabling the control unit to have access to the memory; and an interface unit electrically coupled to the control unit for providing interfaces between the control unit and a user, wherein the control unit further includes: a central processing unit; the priority-determination-standard-setting unit electrically coupled to the central processing unit; and the priority-level determining unit electrically coupled through the central processing unit to the priority-determination-standard-setting unit.

It is further preferable that the control unit furthermore includes a priority-displaying unit electrically coupled through the central processing unit to the priority-level determining unit for displaying the determined priority level on the display unit.

It is furthermore preferable that the control unit moreover includes a display driver electrically coupled to the central processing unit and also coupled to the display unit.

This second aspect of the present invention has the same effects and advantages described above in connection with the first aspect of the present invention.

A third aspect of the present invention is a method of determining a priority level of a call to a telecommunication device. The method comprises the steps of: executing an accumulative-count of non-responded calls removed from the same call number; verifying whether the accumulative-counted value is not less than a first predetermined value, and returning to the step of executing the accumulative-count if the accumulative-counted value is less than the first predetermined value; verifying whether a time interval between a last call-receiving time of a last-received non-responded call and a past call-receiving time of a past-received non-responded call is within a predetermined time period, if the accumulative-counted value is not less than the first predetermined value and determining that the priority level is high if the time interval is within the predetermined time period.

A fourth aspect of the present invention is a method of determining a priority level of a call to a telecommunication device. The method comprise the steps of: verifying whether a calling-time-period of a currently received call is not less than a predetermined time period; and determining that the priority level is high if the calling-time-period is not less than the predetermined time period.

A fifth aspect of the present invention is a method of notifying a priority level of a call to a telecommunication device. The method comprises the steps of: executing an accumulative-count of non-responded calls removed from the same call number; verifying whether the accumulative-counted value is not less than a first predetermined value, and returning to the step of executing the accumulative-count if the accumulative-counted value is less than the first predetermined value; verifying whether a time interval between a last call-receiving time of a last-received non-responded call and a past call-receiving time of a past-received non-responded call is within a predetermined time period, if the accumulative-counted value is not less than the first predetermined value; placing a priority-flag into ON-state if the time interval is within the predetermined time period; verifying whether the priority-flag is ON-state or OFF-state; and displaying the non-responded call along with a priority if the priority-flag is ON-state.

It is preferable that the non-responded call displayed along with not only the priority but also at least a user-related information.

A sixth aspect of the present invention is a method of determining a priority level of a call to a telecommunication device. The method comprises the steps of: verifying whether a calling-time-period of a currently received call is not less than a predetermined time period; placing a priority-flag into ON-state if the calling-time-period is not less than the predetermined time period; verifying whether the priority-flag is ON-state or OFF-state; and displaying the non-responded call along with a priority if the priority-flag is ON-state.

It is preferable that the non-responded call displayed along with not only the priority but also at least a user-related information.

First Embodiment

A first embodiment according to the present invention will be described in detail with reference to the drawings. FIG. 1 is a block diagram illustrative of an internal structure of a novel wireless mobile telephone device in a first embodiment in accordance with the present invention. The novel wireless mobile telephone device includes a control unit 11, a memory device 12, a radio unit 13, an antenna 109, a voice processing unit 14, a voice input/output unit 15, an input unit 106, and a display unit 108.

The radio unit 13 is electrically coupled to the antenna 109 for receiving and transmitting a radio wave. The radio unit 13 is also electrically coupled to the control unit 11, so that the radio unit 13 operates under the control of the control unit 11. The voice processing unit 14 is also electrically coupled to the control unit 11, so that the voice processing unit 14 operates under the control of the control unit 11. The display unit 108 is also electrically coupled to the control unit 11, so that the display unit 108 operates under the control of the control unit 11. The voice input/output unit 15 is also electrically coupled to the control unit 11, so that the voice input/output unit 15 operates under the control of the control unit 11. The input unit 106 is also electrically coupled to the control unit 11, so as to provides an interface between the user and the control unit 11. The memory 12 is also electrically coupled to the control unit 11, so that the user may have an access to the memory 12 under the control of the control unit 11.

The control unit 11 has a priority determination function block 11a, a priority display function block 11b, a priority determination standard setting function block 11c, a display driver 11d and a central processing unit 11e, which is electrically coupled to the priority determination function block 11a, the priority display function block 11b, the priority determination standard setting function block 11c, and the display driver 11d separately. The display driver 11d is electrically coupled to the display unit 108 for driving the display unit 108. The priority determination standard setting function block 11c sets a priority determination standard. A call is received by the antenna 109 and then transmitted through the radio unit 13 to the control unit 11.

The priority determination function block 11a in the control unit 11 determines a priority level of a received non-responded call in accordance with the priority determination standard given by the priority determination standard setting function block 11c. The result of the priority determination made by the priority determination function block 11a is transmitted through the central processing unit 11e to the priority display function block 11b. The priority display function block 11b has an access to the memory 12 to read display data corresponding to the result of the priority determination. The display data are then transmitted to the display unit 108 for enabling the display unit 108 to display the priority of the call in accordance with the display data.

If the display unit 108 uses a color liquid crystal display, then the priority display function block 11b sets a color which corresponds to the determined priority level, for representing the color for the priority level. For example, the priority display function block 11b may optionally set a color of a background area to a character which represents the existence of the past-received non-responded call.

Figure 2:
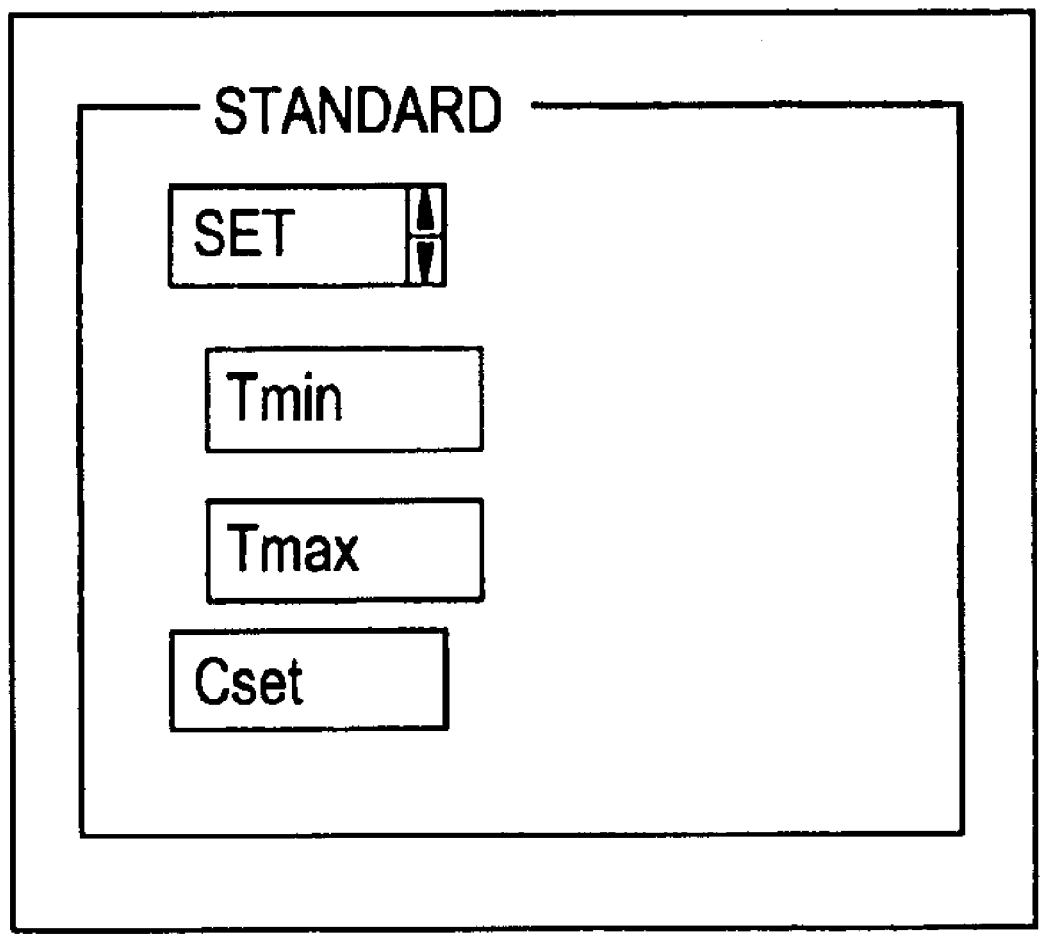
FIG. 2 is a plan view illustrative of an interface to user possessed by the priority determination standard setting function block provided in the novel wire-less mobile telephone of FIG. 1.

The priority determination standard setting function block 11c sets a priority determination standard for determining the priority level of the received non-responded call. FIG. 2 is a plan view illustrative of an interface to user possessed by the priority determination standard setting function block provided in the novel wire-less mobile telephone of FIG. 1. The priority determination standard setting function block 11c has a user interface for enabling the user to set the priority determination standard in user's discretion. For example, the user interface may allow the user to enter plural parameters such as a maximum time "Tmax", a minimum time "Tmin", and a critical value "Cset" of the number of times of the received calls in a time period ranged between the maximum time "Tmax" and the minimum time "Tmin".

The priority determination standard setting function block 11c creates the priority determination standard in accordance with the above plural parameters entered through the user interface. If the above three parameters are the default values, then the priority determination standard setting function block 11c creates no priority determination standard. If the number of receiving times of the same telephone number calls within the time period defined by the maximum time "Tmax" is at least the critical value "Cset", then this is made correspond to a first priority determination standard "1" which represents that the call is important and the priority level is high.

The maximum time "Tmax" and the critical value "Cset" are set by the user through the user interface and the input unit 106, thereby to set the first priority determination standard "1". It is no problem if the minimum time "Tmin" is default. The priority determination function block 11a may determine the priority level of the received non-responded call in accordance with the first priority determination standard "1". This first priority determination standard "1" is one example of the available priority determination standards.

The memory 12 includes a read only memory 12a and a random access memory 12b which are separately accessible from the control unit 11. The read only memory 12a stores programs, in accordance with which the control unit 12 controls the other units. The read only memory 12a also stores other predetermined data and informations such as fixed images and character font data to be used by the display unit 108. The random access memory 12b stores developed programs and data from the read only memory 12a, so that the control unit 11 may have random accesses to the random access memory 12b for reading the stored data and programs. The call history data are also stored in the random access memory 12b.

The voice processing unit 14 performs an analog-to-digital conversion for converting analog signals to digital signals and also coding the digital signals. The coded voice data are transmitted through the control unit 11 to the radio unit 13. The radio unit 13 modulates the coded voice data under the control of the control unit 11. The modulated analog voice signal is then transmitted from the antenna 109 to a base station which is not illustrated.

A radio wave transmitted from the base station is received by the antenna 109 to generate a voice analog signal which is then transmitted to the radio unit 13. The radio unit 13 demodulates the analog voice signal under the control by the control unit 11. The demodulated voice signal is then transmitted to the voice processing unit 14, so that the voice processing unit 14 decodes the demodulated voice signal. The voice processing unit 14 further performs a digital-to-analog signal to generate an analog voice signal.

The voice input output unit 15 includes a receiver 110 and a microphone 111. The receiver 110 performs an electro-acoustic conversion for reproducing a voice. The microphone 111 converts the voice into an analog voice signal. The analog voice signal is then transmitted through the control unit 11 to the voice processing unit 14.

The display unit 108 is driven by an LCD driver 11d for displaying the display data stored in the memory 12. The display unit 108 also displays priority-related data from the priority display function block 11b, thereby to provide the user with visible priority-informations of the pas-received non-responded calls.

Figure 3:
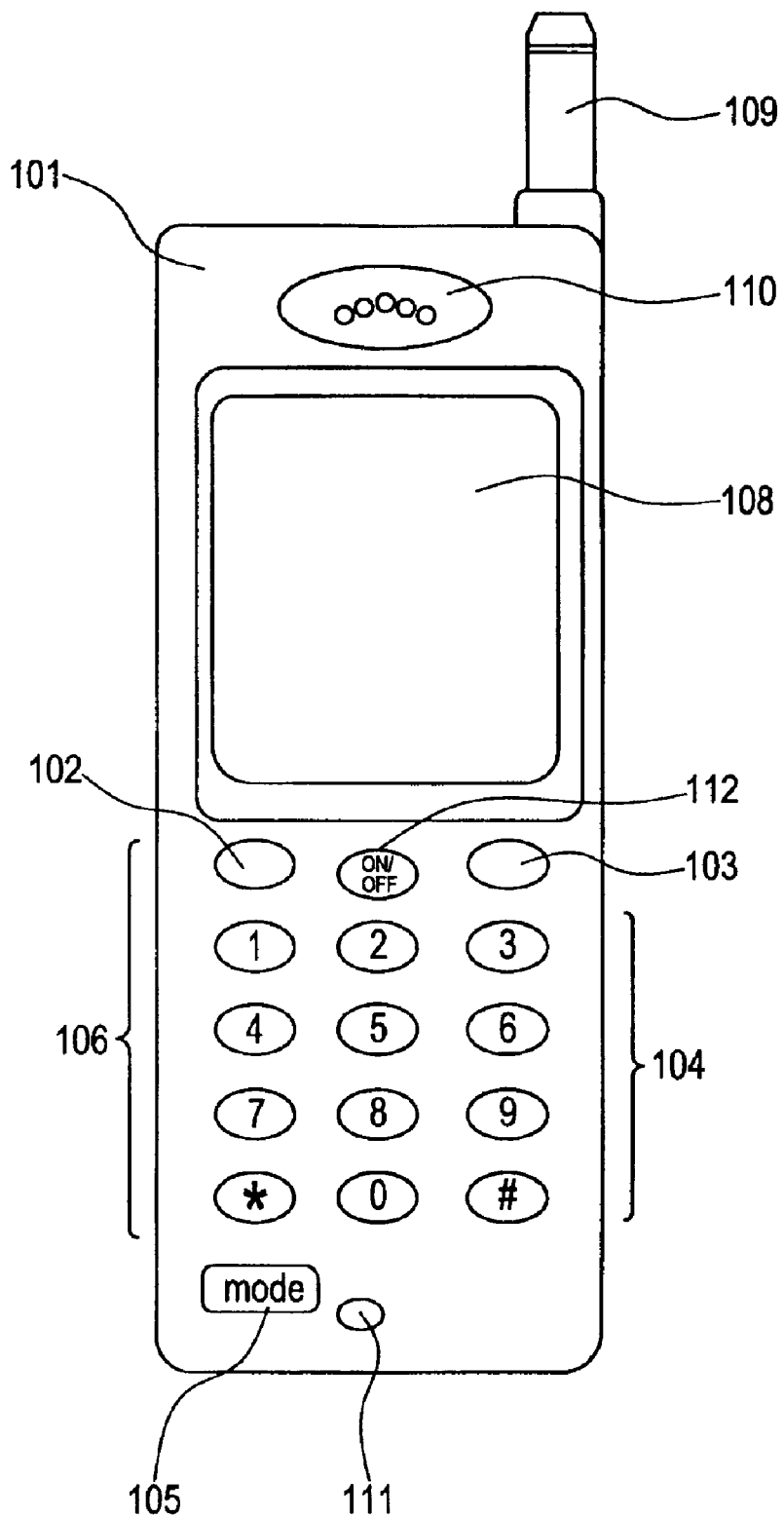
FIG. 3 is a front view of the mobile telephone device of FIG. 1.

FIG. 3 is a front view of the mobile telephone device of FIG. 1. The input unit 106 includes a power button 112, an off-hook button 102, an on-hook button 103, ten keys buttons 104, and a mode switch button 105. The wire-less mobile telephone also has a display unit 108. Input signals entered by the input unit 106 are transmitted to the control unit 11. The combination of the input unit 106 and the display unit 108 provides an interface to the user. The input unit 106 and the display unit 108 may assist the user to enter the numerical values for the priority standard.

The mode switch button 105 is provided to switch the telephone between a normal telephone-operable mode and a priority-determination-mode. Pushing the mode switch button 105 switches from the concurrent one to another of the normal telephone-operable mode and the priority-determination-mode. The telephone performs the priority-determination process but only in the priority-determination-mode.

The ten key buttons 104 include "0" key, "1" key, "2" key, "3" key, "4" key, "5" key, "6" key, "7" key, "8" key, "9" key, "#" key, and "*" key. Those ten keys are allocated with various characters such as alphabets. Pushing the ten key may enter the corresponding number or allocated character. The input number or character is displayed on the display 108, so that the user or operator may visually confirm the entered number or character. Optionally, the display 108 may display an icon which represents the priority-determination-mode.

Pushing the off-hook button 102 upon call-receiving or call-sending transits the telephone into a conversation state. In the speaking state, pushing the off-hook button 102 discontinues the current conversation and enters into a queuing state.

The antenna 109 is attached to a top portion of the wire-less mobile telephone 101. The receiver 110 outputting voice is provided in upper side of the display 108. The microphone 111 inputting voice is provided in lower side of the input unit 106 comprising the array of the ten keys 104.

Figure 4:
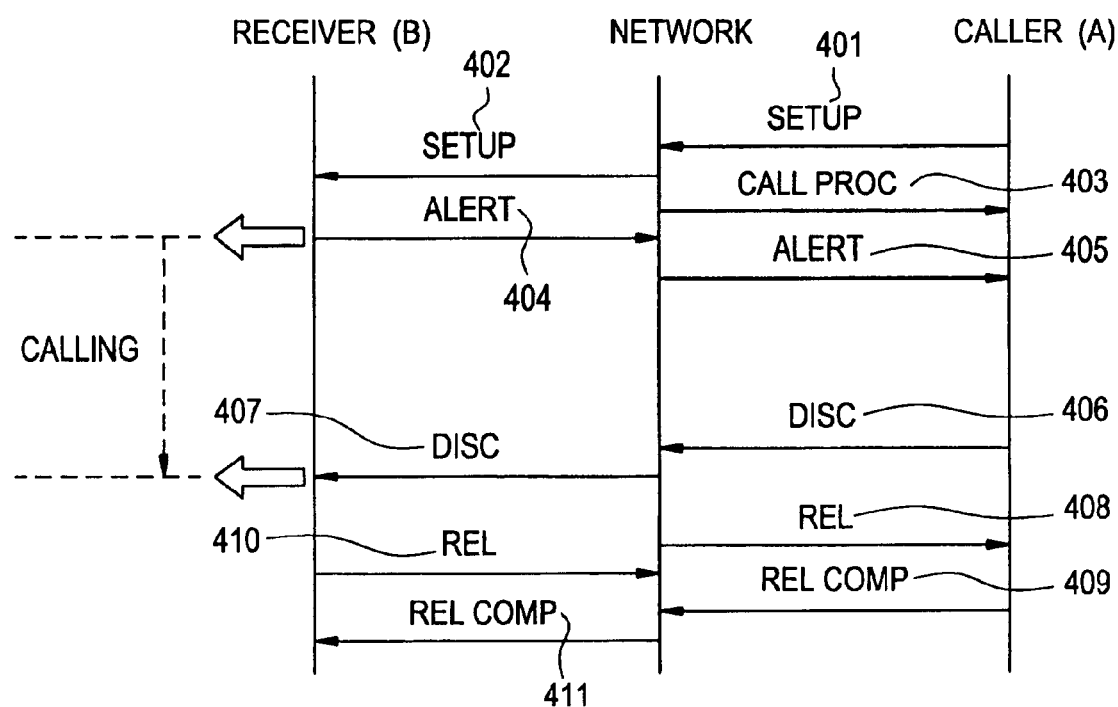
FIG. 4 is a diagram illustrative of a call control sequence in connection with non-responded call in a first embodiment in accordance with the present invention.

FIG. 4 is a diagram illustrative of a call control sequence in connection with non-responded call. A caller "A" calls a receiver "B" with a call-number. A wire-less telephone of the caller "A" transmits a setup signal "SETUP" 401 to a network. The setup signal "SETUP" includes a call number display enable or unable signal, and a call-number-associated information. The network transmits the setup signal "SETUP" 402 to the receiver "B". The network also transmits a signal "CALL PROC" 403, which represents that the network has received the setup signal "SETUP", to the wire-less telephone of the caller "A".

A wire-less telephone of the receiver "B" receives the setup signal "SETUP" 402 from the network and then transmits an alert signal "ALERT" 404 to the network. The wire-less telephone of the receiver "B" also start to ringing (RBT) from the receiver 110.

If the receiver "B" has responded to the call, the wire-less telephone of the receiver "B" transmits a connection signal "CONN" to the network. If the receiver "B" has not responded to the call, it is possible that the caller "A" voluntarily discontinues the current call, the wire-less telephone of the caller "A" transmits a disconnection signal "DISC" 406 to the network, whereby the wire-less telephone of the receiver "B" discontinues ringing.

Upon receipt of the disconnection signal "DISC" 406 from the wire-less telephone of the caller "A", the network further transmits the disconnection signal "DISC" 407 to the wire-less telephone of the receiver "B" and also transmits a release signal "REL" 408 to the wire-less telephone of the caller "A". Upon receipt of the release signal "REL" 408 from the network, the wire-less telephone of the caller "A" transmits a release completion signal "REL COMP" 409 to the network.

Upon receipt of the disconnection signal "DISC" from the network, the wire-less telephone of the receiver "B" discontinues ringing and transmits the release signal "REL" 410 to the network. Upon receipt of the release signal "REL" 410 from the wire-less telephone of the receiver "B", the network transmits a release completion signal "REL COMP" 411 to the wire-less telephone of the receiver "B", thereby completing the call control sequence.

If the call has not been responded, then a remark is displayed on the display 108 for indicating the non-responded call.

Figure 5:
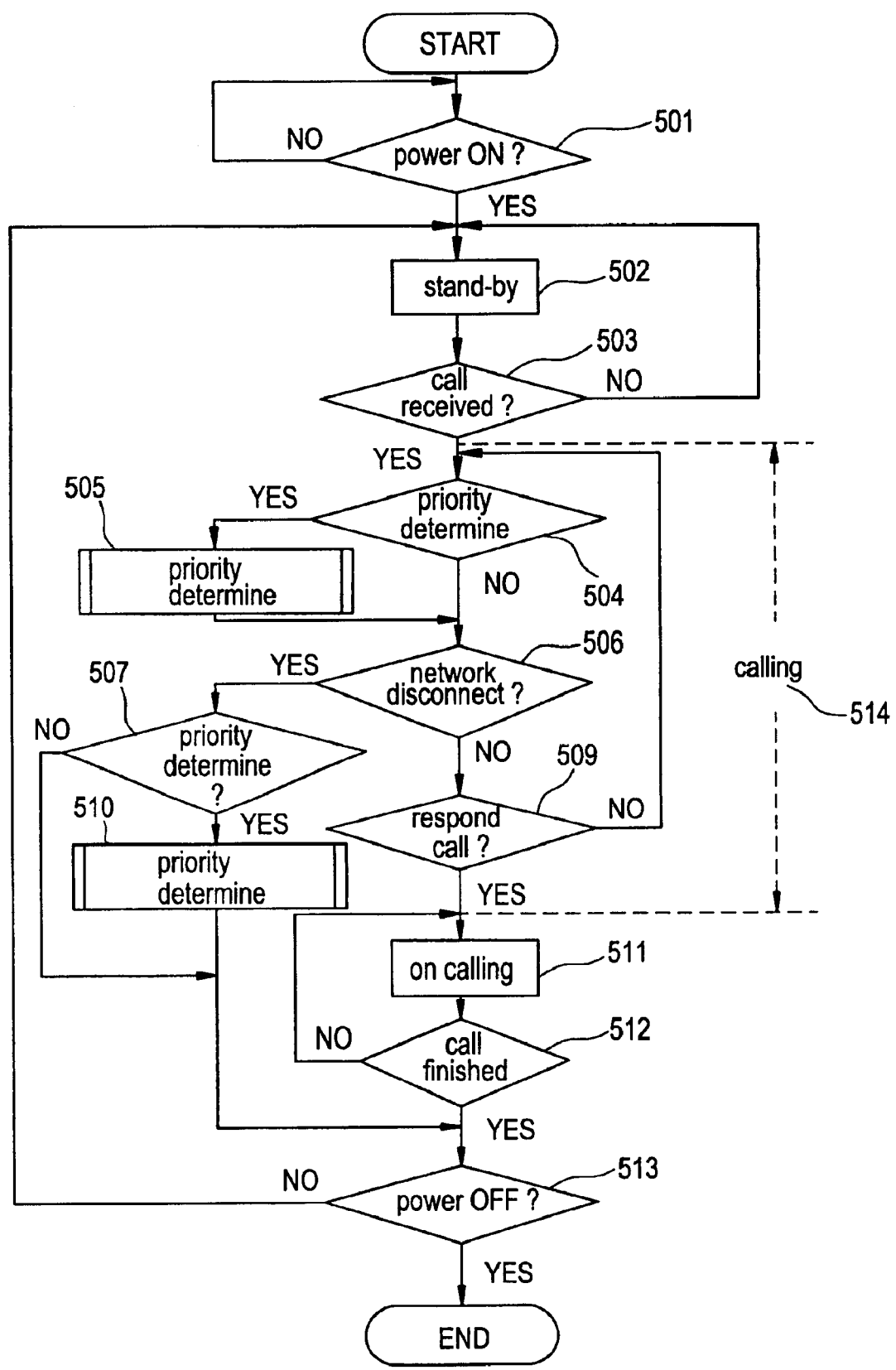
FIG. 5 is a flow chart illustrative of operations of the wire-less mobile telephone upon receipt of a call in a first embodiment in accordance with the present invention.

FIG. 5 is a flow chart illustrative of operations of the wire-less mobile telephone upon receipt of a call. In a step S501, a verification is made whether the wire-less mobile telephone 101 is placed in power-ON state. If the power-ON state could be verified, then the wire-less mobile telephone 101 enters into the queuing state in a step S502. If the power-ON state could not be verified, then the above verification operation will be repeated. Pushing the power button switches the power ON/OFF states.

After the entry into the queuing state, it is verified whether the telephone is receiving or has received any call in step S503. If no call could be verified, then the telephone is maintained in the queuing state. If any call could be verified, then the telephone enters into a call-state 514. This call-state 514 is defined to be a state, into which the telephone enters upon receipt of the alert signal "ALERT" transmitted through the network from the wire-less telephone from the caller "A", and from which the telephone is released upon transmission of the discontinuation signal "DISC" from the wire-less telephone from the caller "A".

After the call could be verified, it is verified whether the telephone is placed in the priority-determination-mode or the normal telephone operable mode. If the telephone is placed in the priority-determination-mode, then the telephone performs the priority-determination-process for recognizing the priority level of the received call in a step S505. After the priority-determination-process has been completed, then the telephone enters into the normal telephone operable mode.

In the normal telephone operable mode, the telephone monitors any disconnection in the network in a step S506. If no disconnection in the network could be verified, then it is verified whether or not a response has been made to the received call in a step S509. If no response to the received call could be verified, then the telephone enters back to the step 504 of verification to the priority-determination-mode. If the disconnection in the network could be verified, then it is again verified whether the telephone is placed in the priority-determination-mode or the normal telephone operable mode in a step S507. If the telephone is placed in the priority-determination-mode, then the telephone performs the priority-determination-process for recognizing the priority level of the received call in a step S510. After the priority-determination-process has been completed, then the telephone enters into the conversation termination. If the telephone is placed in the normal telephone operable mode, then the telephone also enters into the conversation termination. It is further verified whether the telephone is placed in power-ON state or power OFF state in a step S513. If the telephone is in the power-ON state, then the telephone enters back to the queuing state in the step S502. If the telephone is in the power-OFF state, then the operation will end.

If the response to the received call could be verified in the step S509, then the telephone enters into the conversation state in the step S511, wherein the caller "A" and the receiver "B" have conversations with each other. In the conversation state, the telephone monitors whether the conversation becomes terminated or still continued in a step S512. Unless the termination of the conversation could be confirmed, then the telephone is maintained in the conversation state. After the termination of the conversation could be confirmed, then it is verified whether the telephone is placed in power-ON state or power OFF state in the step S513. If the telephone is in the power-ON state, then the telephone enters back to the queuing state in the step S502. If the telephone is in the power-OFF state, then the operation will end.

Figure 6:
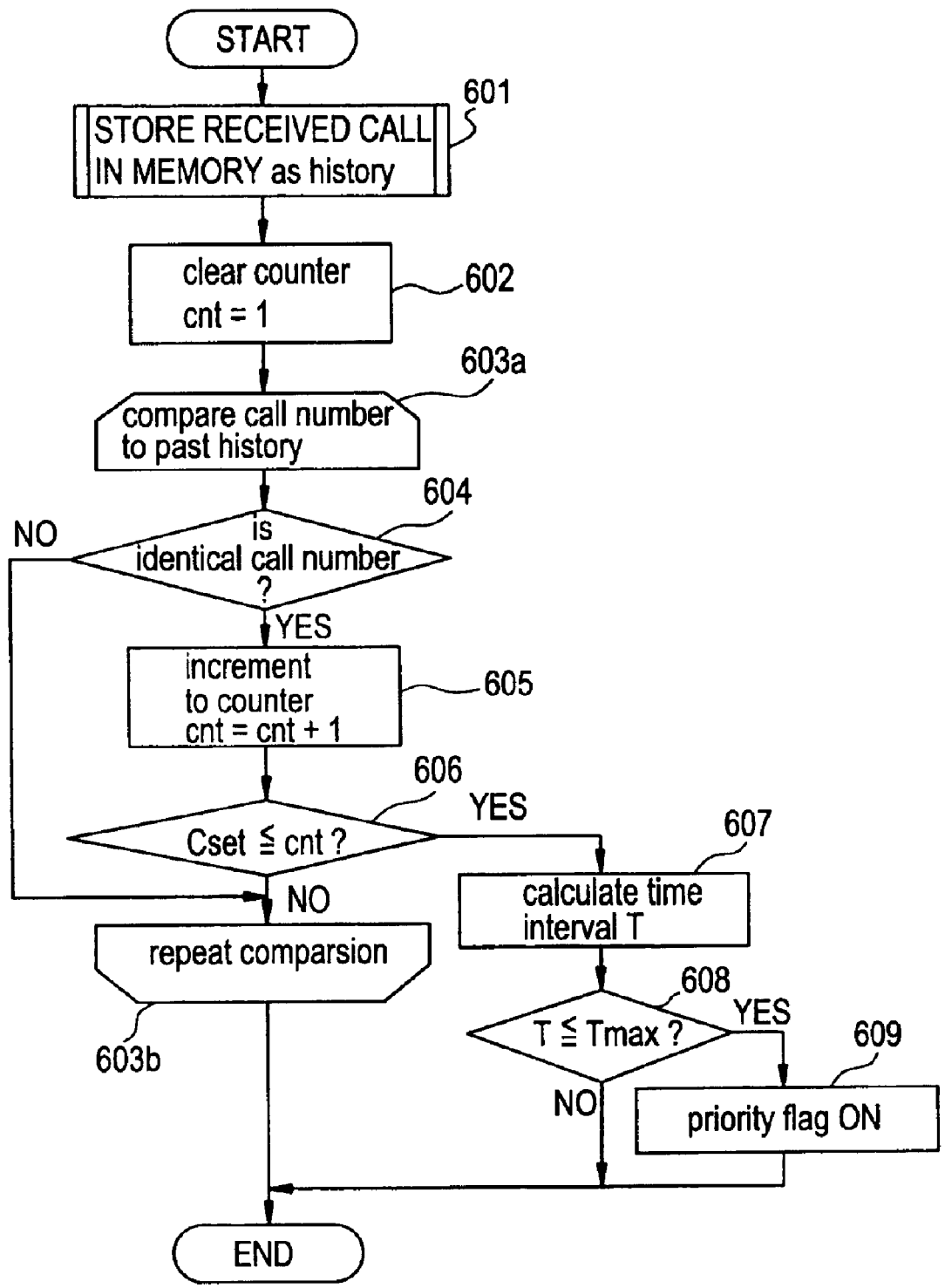
FIG. 6 is a flow chart of the priority-determination-process performed by the priority determination function block in a first embodiment in accordance with the present invention.

The following descriptions will focus on the priority-determination-process performed by the priority determination function block 11*a* in the above step S505. FIG. 6 is a flow chart of the priority-determination-process performed by the priority determination function block. The priority determination standard setting function block 11*c* sets the priority determination standard in accordance with the plural parameters entered through the user interface. If the above three parameters are the default values, then the priority determination standard setting function block 11c creates no priority determination standard. If the number of receiving times of the same telephone number calls within the time period defined by the maximum time "Tmax" is at least the critical value "Cset", then this is made correspond to a first priority determination standard "1" which represents that the call is important and the priority level is high.

The above processes are made as follows. In a step S601, the call number of the non-responded call and the call-received time are added into the past call history informations. In a step S602, a counter "CNT" is initialized, wherein the counter counts the number of call times with the same caller's telephone number. In order to count the number of call times, the initialized value is 1. In subsequent steps 603a, 604, 605, 606 and 603b, looped processes are executed for comparing the currently received call with all of the past-received calls in view of the caller's telephone number. The currently received call is compared to all of the past-received calls in view of the caller's telephone number, wherein the past-received calls are included in the past-received call history. Optionally, the currently received call may be compared in the sequence of the received time of the past-received calls from the last-received one to the oldest-received one.

Namely, in a step 603a, the currently received call is compared to all of the past-received calls in view of the caller's telephone number. In a step 604, it is verified that the currently received call is identical in view of the caller's telephone number to currently compared one of the past-received calls. If the identification could be verified, then an increment to the counter "CNT" by 1 is made in a step 605. After the increment to the counter "CNT", it is verified whether the counted value of the counter "CNT" is not less than a pre-set value "Cset" in a step 606. If the counted value of the counter "CNT" is above the pre-set value "Cset", then a time interval "T" between the latest call-received time of the currently received call and the past-received time of the currently comparing past-received call is calculated in a step 607. It is verified whether or not the calculated time interval "T" is not more than a pre-set maximum time interval "Tmax" in a step 608. If the calculated time interval "T" is not more than the pre-set maximum time interval "Tmax", then a priority-display flag becomes ON to notify that the currently received or last received call has the high priority in accordance with the priority-determination-standard in a step 609, whereby the priority-determination-process is finished. If the calculated time interval "T" is more than the pre-set maximum time interval "Tmax", then the priority-display flag is OFF to notify that the currently received or last received call has the low priority in accordance with the priority-determination-standard, and subsequently the priority-determination-process is finished.

Figure 7:
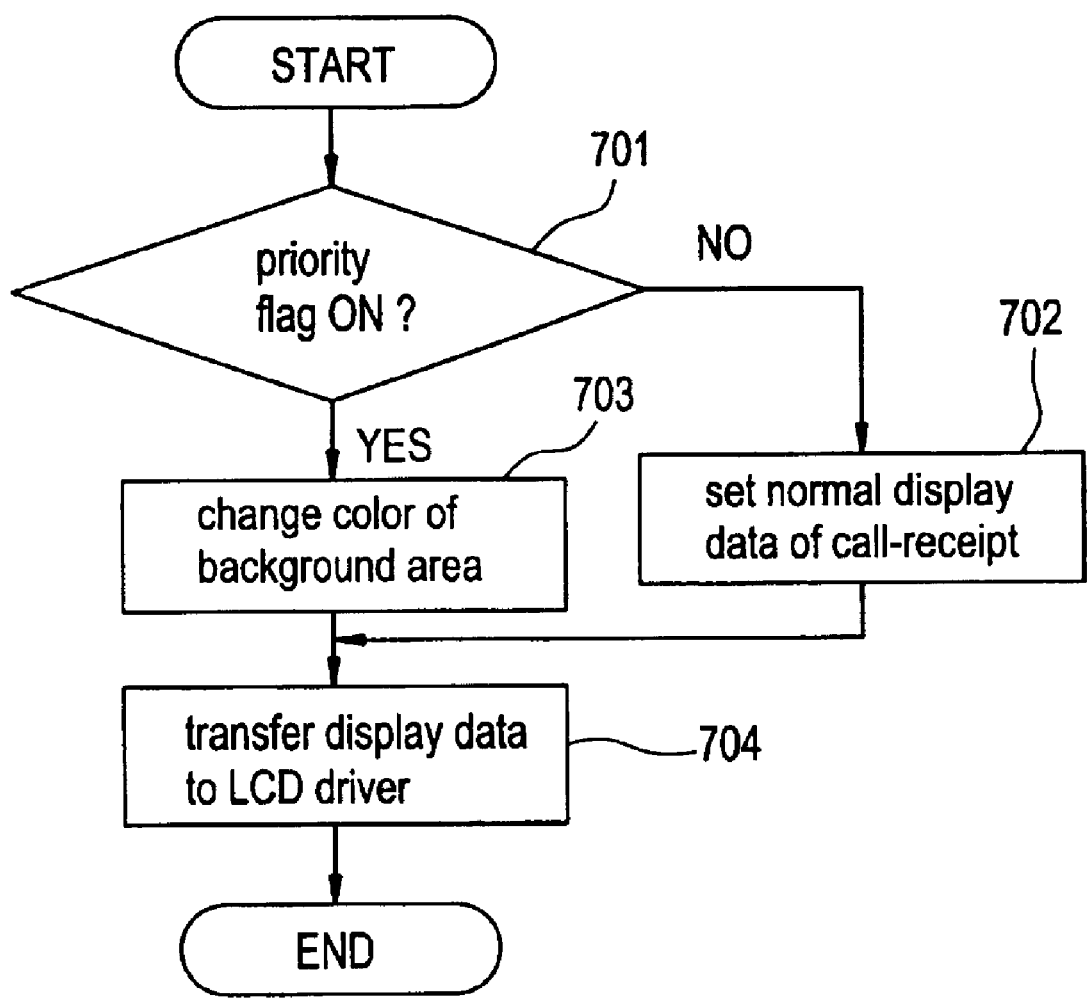
FIG. 7 is a flow chart illustrative of a priority display process by the priority display function unit in a first embodiment in accordance with the present invention.

FIG. 7 is a flow chart illustrative of a priority display process by the priority display function unit. In the step 510, the priority display process is executed as follows. In a step 701, it is verified whether the priority-display flag is ON or OFF. If the priority-display flag is ON, then the priority should be displayed. Therefore, in a step 703, a color of the background area of characters notifying the "call-received" is changed from normal color to a predetermined different color. In a step 704, display data including changed color of the background area are then transferred to the LCD driver. If the priority-display flag is OFF, then the color of the background area of characters notifying the "call-received" remains unchanged, and the normal display data are set in a step 702. The display data are then transferred to the LCD driver in the step 704.

As described above, the priority may be displayed by the different or changed color of the background area of the characters which represent the "call-received". If the priority level is high, then the priority display flag becomes ON, whereby the color of the background area is changed.

In accordance with the present invention, however, if the number of times of the received calls with the same caller's telephone number is larger the predetermined standard value, then the telephone recognizes that the priority of the received calls is high, whereby the priority-display flag becomes ON and the priority is displayed.

The wire-less mobile telephone is capable of setting the priority-determination-standard for determining the priority level of the received call, for which reason it is possible to display the priority with the received non-responded call on the display unit of the wire-less mobile telephone with no additional setting process to the existent base station nor changing the radio interface signal.

The novel wire-less mobile telephone has the priority-determination-standard setting function block 11c for enabling the user to set the priority-determination-standard in the user's discretion by operations of the input unit 106 thereof, so that the display unit 108 displays the received call with the priority in accordance with the priority-determination-standard. The priority-determination-standard may be changed anytime by the user's discretion by changing the maximum time interval "Tmax" and the pre-set value "Cset".

Figure 8:
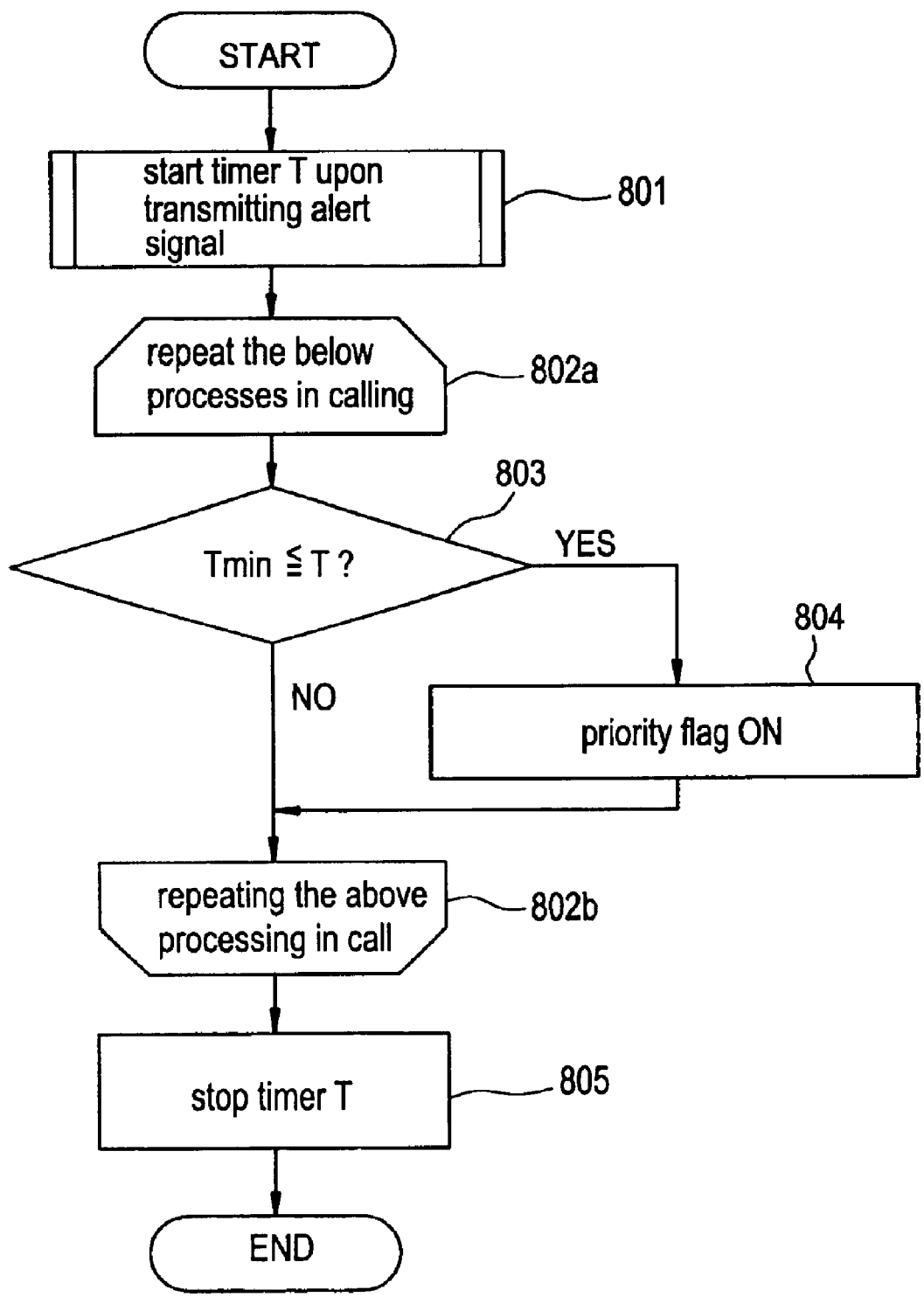
FIG. 8 is a flow chart of the priority-determination-process performed by the priority determination function block in a modified embodiment in accordance with the present invention.

The above described priority-determination-standard may be modified as follows. A minimum time interval "Tmin" has been set, so that if the call continues over the minimum time interval "Tmin", then the priority is determined to be high. The priority determination standard setting function block 11c sets the priority determination standard in accordance with the single parameter entered through the user interface. FIG. 8 is a flow chart of the priority-determination-process performed by the priority determination function block. The priority-determination-process in the step 505 in FIG. 5 is carried out as follows. In the step 404 in FIG. 4, the wire-less telephone of the receiver "B" transmits the alert signal "ALERT" to the network, and the priority-determination-process starts.

In a step 801, a timer "T" starts at the same time when the wireless telephone of the receiver "B" transmits the alert signal "ALERT" to the network. In steps 802a through 802b, the wire-less telephone of the receiver "B" enters into the call-state, and the looped processes start. In a step 803, it is verified that a counted time by the timer "T" becomes more than the pre-set minimum time interval "Tmin". If the counted time by the timer "T" is not less than the pre-set minimum time interval "Tmin", then the priority-display flag becomes ON in a step 804. The above verification is continued during the call. If the counted time by the timer "T" is less than the pre-set minimum time interval "Tmin", then the above verification will be repeated until the calling is stopped. The long time calling over the pre-set minimum time interval "Tmin" means that the priority of the call is high. After the calling is stopped, then the counting operation of the timer "T" is stopped in a step 805.

The following modification to the above novel wire-less mobile telephone may optionally be available, wherein if the priority is high, then telephone owner's informations are also displayed along with the priority on the display unit. It is assumed that even the telephone owner has an intention to respond to the current call, the owner is placed in an unable situation to respond to the call. For example, the owner lost his or her telephone, or the owner may call his or her telephone to find out the same by himself or herself. Alternatively, the owner may call his or her telephone to enable a third person to find out the telephone. If the third person could find the telephone and pick up the same, the modified telephone displays the owner's information on the display unit, so that the third person may contact or communicate with the owner based on the displayed owner's information.

The owner's information may optionally be displayed along with the priority only if the priority of the call is determined to be high. For example, the priority-determination-standard may be set as follows. The number of discontinuous ringing times of a single call is counted and compared to a pre-set value. If the number of discontinuous ringing times of the single call is not less than the pre-set value, then the priority of this call is determined to be high, and the priority-display flag becomes ON, and further the owner's information is set and then transmitted together with the display data to the display driver.

Figure 9:
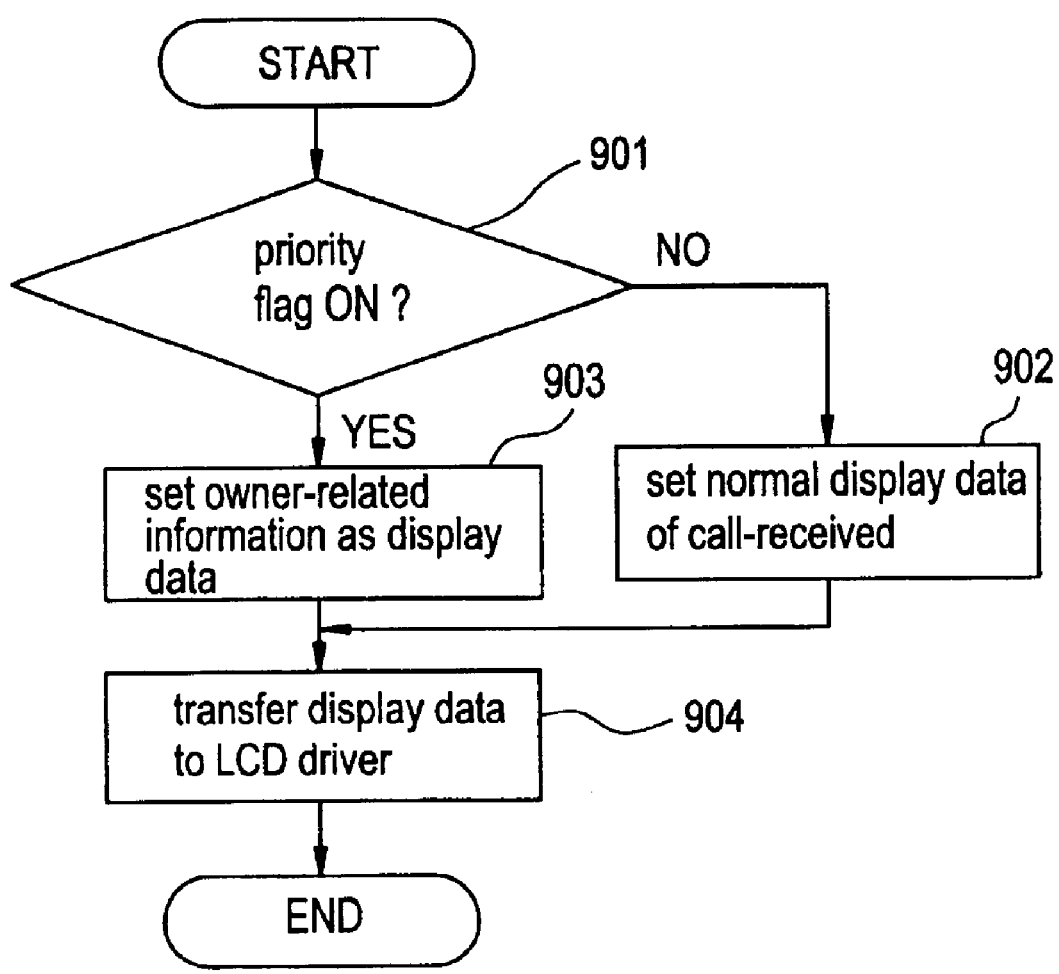
FIG. 9 is a flow chart illustrative of a modified priority-display process by the priority display function unit in another modified embodiment in accordance with the present invention.

FIG. 9 is a flow chart illustrative of a modified priority-display process by the priority display function unit. In the step 510, the priority display process is executed as follows. In a step 901, it is verified whether the priority-display flag is ON or OFF. If the priority-display flag is ON, then the owner's information previously stored in the memory is set to be displayed in a step 903, wherein the owner's information may include user's contact information. The owner's information is then transmitted together with the normal display data to the LCD driver in a step 904, whereby the owner's information is displayed together with the priority of the call. If the priority-display flag is OFF, then the normal display data are set in a step 902, so that the normal display data free of the owner's information are transmitted to the LCD driver in the step 904.

The above wire-less mobile telephone is free from the problems or disadvantages described. Namely, the above wire-less mobile telephone may be capable of not only simple-displaying the past call history informations including the call times and the sender's names and/or sender's telephone numbers but also advanced-displaying the past call history informations based on the priority data.

The above wire-less mobile telephone may be capable of selectively notifying calls with high priority levels from the past call history informations.

The above wire-less mobile telephone may be capable of sending a call with the priority which corresponds to the receiver's side priority standard.

The above wire-less mobile telephone may be capable of setting the priority in response to the change to the receiver's side priority standard.

The above wire-less mobile telephone may be capable of selecting past non-responded calls with a high priority recognized in accordance with an optionally set priority-determination-standard to enable the user to easily recognize whether the non-responded call is important.

The above wire-less mobile telephone may be capable of recognizing the priority for displaying the high priority call with a priority-indicating flag to enable the user to visually recognize the priority.

The above wire-less mobile telephone may be capable of recognizing the high priority of the received call and displaying the non-responded call with the high priority with no change to an existent base station system nor modification to radio interface signals.

The above wire-less mobile telephone may allow the call-receiver to optionally set the priority-determination-standard for displaying the priority of the non-responded call in accordance with the user's intention, whereby a freedom how to display or notice the priority is increased.

The above wire-less mobile telephone may allow the user to freely change the optionally set priority-determination-standard in his or her discretion.

The above wire-less mobile telephone may allow that if the owner has lost the device, then the owner may send the lost device his or her call to notify the finder of the lost device.

The above descriptions have been made by taking the wire-less mobile telephone as one example. It is, however, possible to apply the above present invention to any other telecommunication devices including wireless and wired telecommunication devices, and mobile and stationed telecommunication devices. The telecommunication devices may, of course, include telephone devices and other communication devices which are capable of communications to a distanced target.

In the above descriptions, the priority is displayed on the display unit which is provided for displaying the other informations. It is, of course, possible to display the priority on an exclusive display portion or an exclusive display screen which is provided for displaying the priority only.

In the above descriptions, the priority level is represented by the presence or absence of the priority. It is, of course, possible that plural priority levels may be determined and displayed.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A telecommunication device comprising:
    a telecommunication function block for receiving a call from another telecommunication device for communication; and
    a priority-determination-standard-setting function block for setting a priority-determination-standard for determining a priority of a received call;
    a priority-level determining function block electrically coupled to said priority-determination-standard-setting function block for determining a priority level of said call in accordance with said priority-determination-standard; and
    an input interface for entering at least a parameter into said priority-determination-standard-setting function block to enable said priority-determination-standard-setting function block to set said priority-determination-standard in accordance with said entered at least parameter,
    wherein said entered at least parameter comprises a maximum time period and a minimum number of call-receiving times, and said priority-level determining function block determines that a priority level would be high if said telecommunication device receives a larger number of calls than said minimum number from another telecommunication device within said maximum time period.

2. The telecommunication device as claimed in claim 1, further comprising a priority-notifying function block electrically coupled to said priority-level determining function block for notifying said determined priority level to user.

3. The telecommunication device as claimed in claim 2, further comprising a display unit electrically coupled to said priority-notifying function block, wherein said priority-notifying function block comprises a priority-displaying function block for displaying said determined priority level on said display unit.

4. The telecommunication device as claimed in claim 3, wherein said display unit commonly displays not only said determined priority level but also any other data and informations.

5. The telecommunication device as claimed in claim 3, wherein said display unit exclusively displays only said priority level.

6. The telecommunication device as claimed in claim 1, wherein said entered at least parameter comprises a minimum time period of a ringing time of a single call, and said priority-level determining function block determines that a priority level would be high if said telecommunication device receives a call which rings in a time period longer than said minimum time period.

7. The telecommunication device as claimed in claim 3, further comprising a memory electrically coupled to said priority-displaying function block for reading out at least a pre-stored information from said memory and transmitting said read information to said priority-displaying function block for displaying said information together with a priority.

8. The telecommunication device as claimed in claim 7, wherein said information includes an information related to an owner of said telecommunication device.

9. The telecommunication device as claimed in claim 1, wherein said priority-determination-standard-setting function block and said priority-level determining function block are integrated in a control unit.

10. The telecommunication device as claimed in claim 9, further comprising an input interface electrically coupled to said control unit for entering at least a parameter into said priority-determination-standard function block to enable said priority-determination-standard function block to set said priority-determination-standard in accordance with said entered at least parameter.

11. The telecommunication device as claimed in claim 2, wherein said priority-determination-standard-setting function block, said priority-level determining function block and said priority-notifying function block are integrated in a control unit.

12. The telecommunication device as claimed in claim 11, further comprising an input interface electrically coupled to said control unit for entering at least a parameter into said priority-determination-standard function block to enable said priority-determination-standard function block to set said priority-determination-standard in accordance with said entered at least parameter.

13. The telecommunication device as claimed in claim 3, wherein said priority-determination-standard-setting function block, said priority-level determining function block and said priority-displaying function block are integrated in a control unit.

14. The telecommunication device as claimed in claim 13, further comprising an input interface electrically coupled to said control unit for entering at least a parameter into said priority-determination-standard function block to enable said priority-determination-standard function block to set said priority-determination-standard in accordance with said entered at least parameter.

15. The telecommunication device as claimed in claim 1, wherein said telecommunication device comprises a wire-less mobile telephone device.

16. The telecommunication device as claimed in claim 15, wherein said wire-less mobile telephone device further includes:
   an antenna for receiving and transmitting a radio wave;
   a control unit;
   a radio unit electrically coupled to said antenna and also electrically coupled to said control unit, so that said radio unit is operable under the control of said control unit;
   a voice processing unit electrically coupled to said control unit for processing voice signals under the control of said control unit;
   a display unit electrically coupled to said control unit for a display under the control of said control unit;
   a memory electrically coupled to said control unit for storing any data and informations for enabling said control unit to have access to said memory; and
   an interface unit electrically coupled to said control unit for providing interfaces between said control unit and a user,
   wherein said control unit further includes:
      a central processing unit;
      said priority-determination-standard-setting function block electrically coupled to said central processing unit; and
      said priority-level determining function block electrically coupled through said central processing unit to said priority-determination-standard-setting function block.

17. The telecommunication device as claimed in claim 16, wherein said control unit furthermore includes a priority-displaying function block electrically coupled through said central processing unit to said priority-level determining function block for displaying said determined priority level on said display unit.

18. The telecommunication device as claimed in claim 17, wherein said control unit moreover includes a display driver electrically coupled to said central processing unit and also coupled to said display unit.

19. A telecommunication device comprising:
   a telecommunication means for receiving a call from another telecommunication device for communication;
   a priority-determination-standard-setting means for setting a priority-determination-standard for determining a priority of a received call; and
   a priority-level determining means electrically coupled to said priority-determination-standard-setting means for determining a priority level of said call in accordance with said priority-determination-standard; and
   an input interface for entering at least a parameter into said priority-determination-standard-setting means to enable said priority-determination-standard-setting means to set said priority-determination-standard in accordance with said entered at least parameter,
   wherein said entered at least parameter comprises a maximum time period and a minimum number of call-receiving times, and said priority-level determining means determines that a priority level would be high if said telecommunication device receives a larger number of calls than said minimum number from another telecommunication device within said maximum time period.

20. The telecommunication device as claimed in claim 19, further comprising a priority-notifying means electrically coupled to said priority-level determining means for notifying said determined priority level to user.

21. The telecommunication device as claimed in claim 20, further comprising a display means electrically coupled to said priority-notifying means, wherein said priority-notifying means comprises a priority-displaying means for displaying said determined priority level on said display means.

22. The telecommunication device as claimed in claim 21, wherein said display means commonly displays not only said determined priority level but also any other data and informations.

23. The telecommunication device as claimed in claim 21, wherein said display means exclusively displays only said priority level.

24. The telecommunication device as claimed in claim 19, wherein said entered at least parameter comprises a minimum time period of a ringing time of a single call, and said priority-level determining means determines that a priority level would be high if said telecommunication device receives a call which rings in a time period longer than said minimum time period.

25. The telecommunication device as claimed in claim 21, further comprising a memory electrically coupled to said priority-displaying means for reading out at least a pre-stored information from said memory and transmitting said read information to said priority-displaying means for displaying said information together with a priority.

26. The telecommunication device as claimed in claim 25, wherein said information includes an information related to an owner of said telecommunication device.

27. The telecommunication device as claimed in claim 19, wherein said priority-determination-standard-setting means and said priority-level determining means are integrated in a control means.

28. The telecommunication device as claimed in claim 27, further comprising an input interface electrically coupled to said control means for entering at least a parameter into said priority-determination-standard means to enable said priority-determination-standard means to set said priority-determination-standard in accordance with said entered at least parameter.

29. The telecommunication device as claimed in claim 20, wherein said priority-determination-standard-setting means, said priority-level determining means and said priority-notifying means are integrated in a control means.

30. The telecommunication device as claimed in claim 29, further comprising an input interface electrically coupled to said control means for entering at least a parameter into said priority-determination-standard means to enable said priority-determination-standard means to set said priority-determination-standard in accordance with said entered at least parameter.

31. The telecommunication device as claimed in claim 21, wherein said priority-determination-standard-setting means, said priority-level determining means and said priority-displaying means are integrated in a control means.

32. The telecommunication device as claimed in claim 31, further comprising an input interface electrically coupled to said control means for entering at least a parameter into said priority-determination-standard means to enable said priority-determination-standard means to set said priority-determination-standard in accordance with said entered at least parameter.

33. The telecommunication device as claimed in claim 19, wherein said telecommunication device comprises a wireless mobile telephone device.

34. The telecommunication device as claimed in claim 33, wherein said wire-less mobile telephone device further includes:
   an antenna for receiving and transmitting a radio wave;
   a control means;
   a radio unit electrically coupled to said antenna and also electrically coupled to said control means, so that said radio unit is operable under the control of said control means;
   a voice processing means electrically coupled to said control means for processing voice signals under the control of said control means;
   a display means electrically coupled to said control means for a display under the control of said control means;
   a memory electrically coupled to said control means for storing any data and informations for enabling said control means to have access to said memory; and
   an interface means electrically coupled to said control means for providing interfaces between said control means and a user,
   wherein said control means further includes:
      a central processing unit;
      said priority-determination-standard-setting means electrically coupled to said central processing unit; and
      said priority-level determining means electrically coupled through said central processing unit to said priority-determination-standard-setting means.

35. The telecommunication device as claimed in claim 34, wherein said control means furthermore includes a priority-displaying means electrically coupled through said central processing unit to said priority-level determining means for displaying said determined priority level on said display means.

36. The telecommunication device as claimed in claim 35, wherein said control means moreover includes a display driver electrically coupled to said central processing unit and also coupled to said display means.

37. A method of determining a priority level of a call to a telecommunication device, said method comprising the steps of:
   executing an accumulative-count of non-responded calls removed from the same call number;
   verifying whether said accumulative-counted value is not less than a first predetermined value, and returning to said step of executing said accumulative-count if said accumulative-counted value is less than said first predetermined value;
   verifying whether a time interval between a last call-receiving time of a last-received non-responded call and a past call-receiving time of a past-received non-responded call is within a predetermined time period, if said accumulative-counted value is not less than said first predetermined value; and
   determining that said priority level is high if said time interval is within said predetermined time period.

38. A method of notifying a priority level of a call to a telecommunication device, said method comprising the steps of:
   executing an accumulative-count of non-responded calls removed from the same call number;
   verifying whether said accumulative-counted value is not less than a first predetermined value, and returning to said step of executing said accumulative-count if said accumulative-counted value is less than said first predetermined value;

verifying whether a time interval between a last call-receiving time of a last-received non-responded call and a past call-receiving time of a past-received non-responded call is within a predetermined time period, if said accumulative-counted value is not less than said first predetermined value; and placing a priority-flag into ON-state if said time interval is within said predetermined time period;

verifying whether said priority-flag is ON-state or OFF-state; and displaying said non-responded call along with a priority if said priority-flag is ON-state.

39. The method as claimed in claim 38, wherein said non-responded call is displayed along with not only said priority but also at least a user-related information.

40. A method of determining a priority level of a call to a telecommunication device, said method comprising the steps of:

receiving a parameter, input by a user, the parameter including a predetermined time period and a minimum number of call-receiving times for calls received from another telecommunication device;

verifying whether a calling-time-period of a currently received call is from said another telecommunication device and is not less than said predetermined time period, and incrementing a counter accordingly;

placing a priority-flag into ON-state if both of the following occur: a) said calling-time-period is not less than said predetermined time period, and b) said counter is greater than the minimum number of call-receiving times;

verifying whether said priority-flag is ON-state of OFF-state; and displaying a non-responded call along with a priority if said priority-flag is ON-state.

41. The method as claimed in claim 40, wherein said non-responded call is displayed along with not only said priority but also at least a user-related information.

* * * * *